Sept. 21, 1954 — T. F. KRUMM — 2,689,762
WEED EXTRACTING DEVICE
Filed Feb. 21, 1949
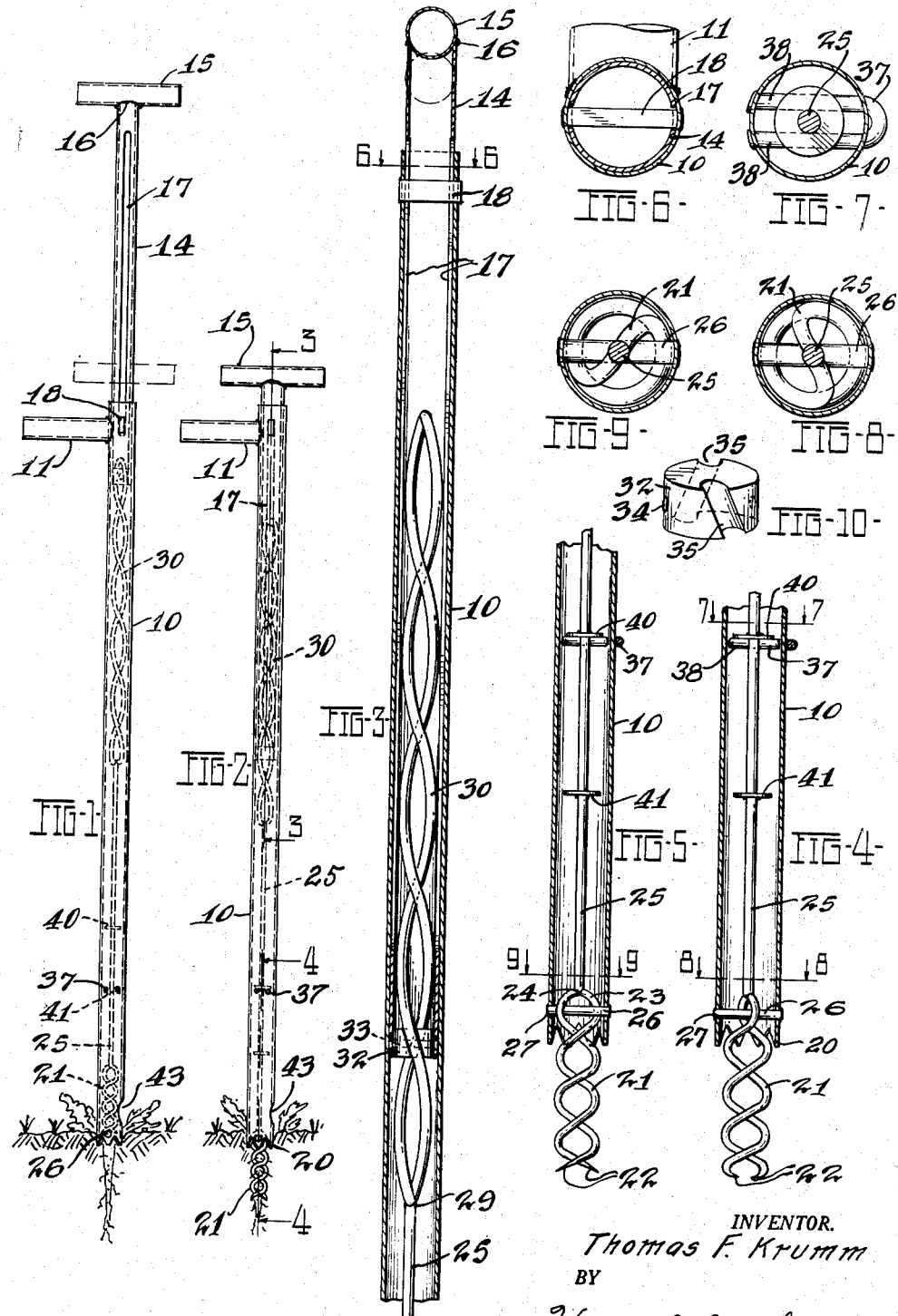
INVENTOR.
Thomas F. Krumm
BY Harry O. Ernsberger
ATTY.

Patented Sept. 21, 1954

2,689,762

UNITED STATES PATENT OFFICE 2,689,762

WEED EXTRACTING DEVICE

Thomas F. Krumm, Toledo, Ohio

Application February 21, 1949, Serial No. 77,485

9 Claims. (Cl. 294—50.6)

This invention relates to devices for extracting plants and growths from the soil and more particularly to manually operated mechanical means for performing the extracting operations.

The invention embraces the provision of means arranged to circumscribe the root of a weed or plant whereby the same may be readily dislodged and extracted from the soil and discharged from the extracting means with a minimum of manual effort.

An object of the invention is the provision of a mechanical device for extracting weeds from the soil whereby the weed engaging element is rotated so as to circumscribe the weed through the manual actuation of a longitudinal movable member.

Another object of the invention is the provision of a weed extracting device in which a spirally shaped element is rotated into circumscribing relation with the root of a plant or weed to be removed and whereby additional rotation of the spiral element is provided for loosening the weed from the soil after the encirclement of the weed to facilitate extraction of the weed or plant.

A further object of the invention is the provision of a weed extracting device in which the major operative elements are contained within a tubular housing whereby the operator or user will not be injured in manipulating the device.

Another object of the invention resides in the provision of a weed extracting device especially adapted to perform extracting operations without disturbing the soil adjacent the weed.

Still another object is the provision of a weed extracting device whereby the root is completely extracted from the soil.

Another object of the invention resides in the provision of a weed extracting device which is simple in operation and one in which the structural elements are not liable to get out of order and which may be economically manufactured.

Another object of the invention resides in the provision of an adequate length of the mechanism so as to enable the user to operate it while remaining in an upright position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view showing a form of weed pulling or extracting device of my invention;

Figure 2 is a view showing the weed engaging element in weed engaging and encircling position;

Figure 3 is a fragmentary longitudinal sectional view illustrating the means for rotating the weed engaging element, the view being taken substantially on the line 3—3 of Figure 2;

Figure 4 is a fragmentary sectional view of the lower end of the weed extracting device showing the weed engaging element in one position, the view being taken substantially on the line 4—4 of Figure 2;

Figure 5 is a view similar to Figure 4 showing the weed engaging element rotated to a different position;

Figure 6 is a horizontal sectional view taken on a line 6—6 of Figure 3;

Figure 7 is a detail sectional view taken substantially on the line 7—7 of Figure 4;

Figure 8 is a detail sectional view taken substantially on the line 8—8 of Figure 4;

Figure 9 is a sectional view taken substantially on the line 9—9 of Figure 5;

Figure 10 is an isometric view of one of the elements forming a part of the structure.

While I have shown the arrangement of my invention as particularly fashioned and adapted for extracting weeds from the soil, it is to be understood that I contemplate the utilization of the principle and arrangement of my invention for any purpose where the same may be found to be applicable.

Referring to the drawings in detail, the device of my invention is inclusive of a housing 10 preferably in the form of a tube which may, if desired, be provided with a laterally extending hand grip portion 11 welded or otherwise secured to the tube or housing 10. Slidably telescoped with the housing 10 is a tube 14 provided at its upper extremity with a handle portion 15 in the form of a short tube welded to the tube 14 as shown at 16. The innermost tube 14 is provided with longitudinally extending diametrically-disposed slots 17 through which extend a pin or stub shaft 18 as particularly shown in Figures 3 and 6. The pin 18 passes through aligned openings in the tube 10 and has its ends swaged to hold the pin in proper position. The pin 18 serves to prevent rotation of tube 14 relative to the tube 10 yet permit longitudinal movement of one tube with respect to the other. The lower end of the outer tube 10 is formed with a plurality of V-shaped prongs or projections 20 to facilitate proper contact of the weed extracting element with the central portion and root of a weed.

Disposed adjacent the lower end of the tube 10 and arranged to be moved into and out from the tube is a weed engaging and extracting element 21 particularly shown in Figures 2, 4 and 5. As illustrated, the element 21 is formed of a rod of circular cross section fashioned in a dual or multiple spiral formation. The free ends of the spirally shaped element 21 are in juxtaposed relationship and are each formed to an apex or pointed shape 22 to facilitate their entrance into the soil. The element 21 is mounted for relative rotary and longitudinal movement with respect to the tube 10. The upper portion of element 21 is fashioned with a loop configuration 23 which is welded as at 24 or otherwise secured to the end of a rod or bar 25. Adjacent the lower end of the tube 10 is a transversely extending pin 26 the ends of which are swaged as at 27 to securely hold the pin in assembled relation with the tube 10.

The upper end of the rod or bar 25 is welded as at 29 to the extremities of member 30 formed into a double spiral configuration. The spiral configuration of the member 30 cooperates with a disc like element 32 which is secured to the lower end of the innermost tube 14 by means of a pin 33 passing through an opening 34 in the disc and through aligned openings in the wall of the tube 14. The member or disc 32 is shown per se in Figure 10 and is provided with angularly disposed peripheral grooves or recesses 35 into which the spiral leg portions of member 30 extend as shown in Figure 3. As the inner member 14 is telescoped into or moved outwardly from the tube 10, the angular relation of the recesses 35 in the disc or member 32 cooperates with the spiral formation of member 30 to rotate rod 25 and the weed engaging and extracting element 21.

A movement limiting means or abutment is provided for restricting the longitudinal movement of the weed extracting member 21 and the rod 25 with respect to the tube or housing 10. As particularly illustrated in Figures 4, 5 and 7, the abutment comprises a U-shaped member 37, the leg portions 38 of the U-shaped member extending through suitable openings in the side walls of the tube 10, the legs 38 being spaced to straddle the rod 25. The U-shaped member 37 may be held in assembled position by swaging the end portions of the legs 38 or by welding the same to the tube. Disposed on the rod 25 are vertically spaced disc-like stops 40 and 41 welded or otherwise secured on the rod 25 which are adapted to engage and cooperate with the abutment means 37 to determine the extent of relative longitudinal movement of the rod 25, weed extracting element 21 and the spirally configurated actuating member 30.

The wall of the outer tube 10 adjacent the soil engaging extremity is formed with an opening 43 to facilitate the discharge of any loosened soil that may be carried upwardly into the tube during weed extracting operations.

One of the features of the present invention is the cooperative action between the plant or weed extracting element 21 and the transversely extending pin 26 carried by the tube 10. As shown in Figure 4, the weed extracting member 21 is in full extended position permitted by reason of the engagement of the stop 40 with the abutment 37. When the weed extracting member 21 has been rotated into this position as determined by the stop 40, the innermost tube 14 has not moved into full telescoping position with the outer tube 10 but is in a partially withdrawn position as shown in Figure 3. In this figure it is to be noted that the element or disc 32 has not moved to its lowermost position so that upon further inward telescoping movement of tube 14 into the tube 10, the rod 25 and weed extracting member 21 are additionally rotated substantially through a radial angle of approximately 90 degrees, viz. to the position indicated in Figure 5. Figure 8 illustrates the relative position of the weed extracting element 21 at the time the stop 40 engages the abutment 37 and Figure 9 illustrates the maximum position of rotation of the weed extracting element 21 caused by further inward telescoping movement of tube 14 and further cooperative action of disc 32 with the spiral configuration 30. This additional rotational movement of the weed extracting member 21 without further longitudinal movement of the member serves to loosen the plant or weed root from the soil so that the same may be easily withdrawn or extracted upon bodily upward movement of the housing or tube 10.

In utilizing the arrangement of my invention for extracting a weed or plant from the soil or earth, the device functions in the following manner: The user or operator places the lower end of tube 10 over the center of a plant or weed to be extracted with the prongs 20 of the tube extending into the soil in the manner illustrated in Figure 1 with the innermost tube 14 in fully extended position. The operator then exerts downward pressure on the handle 15 and the tube 14 to telescope the latter into the tube 10 so that the parts or elements are moved into the position shown in Figure 2. In arriving at this position, the downward or telescoping movement of tube 14 moves the disc 32 in a straight line for the reason that the pin 18 cooperates with the slots 17 to prevent rotation of the inner tube 14 whereby a combined rotary and spiral movement is imparted to the weed extracting member 21 resulting from the cooperative rotary and longitudinal movement of member 30 with disc 32. The rotary and longitudinal movement of the member 30, rod 25 and weed engaging element causes the latter to be spiraled about or encircle the root portion of the plant or weed as shown in Figure 2. When the weed extracting element 21 is fully projected from the tube 10, the element 21 has not only surrounded the weed or plant root but the additional rotative movement of weed extracting member 21 ensuing after longitudinal movement ceases by reason of the disc 40 engaging the stop 37 brings the element 21 to the position shown in Figure 5 and serves to dislodge or loosen the plant root contained within the element 21 so that the root may be readily withdrawn or pulled from the soil by moving the housing 10 upwardly. The extracted weed encircled by the element 21 may be discharged by moving tube 14 relative to the tube 10 in an outward direction thus causing reverse rotation of the element 21 and simultaneous longitudinal movement thereof into the lower end of the tube 10 through the cooperation of the disc 32 and the spirally formed member 30. Reverse longitudinal movement and rotation of the element 21 causes a discharge of the plant root which is prevented from moving upwardly into the housing by reason of its engagement with the pin 26.

An important feature of the present invention is the provision of the added rotation of the weed extracting element 21 after longitudinal movement ceases by reason of the engagement of the stop 40 with the abutment 37 as this action provides a means for loosening the root from the soil so that extraction or pulling the root does not disturb the surrounding soil. The rate of longitudinal movement of element 21 is determined and controlled by the engagement thereof with the pin 26 as the element 21 in effect spirals its way upwardly or downwardly about the pin 26. Thus while the angle of the spiral configuration 30 is relatively acute with respect to the longitudinal axis of the rod 25 and the member 30 and is therefore of considerably greater length than the element 21, the latter may only rotate the number of revolutions determined by the number of complete spirals in the member 30. A further advantage of this construction resides in the fact that it requires considerable longitudinal movement of the tube 14 into the tube 19 to rotate the weed engaging element 21 through rotation of the spiral configuration 30. By this means an extensive multiplication of force is obtained whereby comparatively small amount of force applied to telescope the tube 15 into the housing 10 results in a proportionately greater torque or twisting effort being imparted to the weed extracting element 21.

It is apparent that, within the scope of the invention, modifications and different arrangements may be made other than is herein disclosed, and the present disclosure is illustrative merely, the invention comprehending all variations thereof.

What I claim is:

1. A weed extracting device including a housing; an element having a pair of laterally spaced spirally shaped prongs disposed adjacent one end of the housing for longitudinal and rotary movement into and out of the housing; means including a member extending transversely of and carried by the housing adapted for cooperation with the spirally shaped prongs for controlling relative rotary movement thereof; a member secured to said element and being formed with transversely spaced spirally shaped portions, a tube telescoped within the housing and movable relative thereto, a disc carried by said tube and having walls in slidable connection with the the spirally shaped portions of said member for actuating the same upon longitudinal movement of the tube to cause rotary and longitudinal movement of said weed extracting element relative to the housing, and means interconnecting said housing and tube for preventing rotary movement of the tube relative to the housing.

2. A weed extracting device including a housing; a double pronged weed engaging element disposed adjacent one end of the housing for longitudinal and rotary movement into and out of the housing; means carried by the housing and cooperating with the element for controlling the rotary movement thereof; a member secured to said element, and manually operated reciprocable means movable relative to said housing and having connection with said member for actuating the same to cause rotary and longitudinal movement of said weed engaging element.

3. A weed extracting device including a support; an element having laterally spaced prongs of spiral configuration disposed adjacent one end of the support for longitudinal and rotary movement relative thereto; means carried by the support and cooperating with the spiral prongs of the weed extracting element for controlling the rotary movement of said element; a member secured to said element; means movable relative to said support and having connection with said member for actuating the same to cause rotary and longitudinal movement of said weed extracting element; an abutment carried by said support, and a pair of spaced stops associated with said member and cooperating with said abutment for determining the extent of relative longitudinal movement of said element.

4. A weed pulling device including a tubular support; a weed extracting element having a double spiral configuration disposed adjacent the support for longitudinal and rotary movement relative thereto; means including a pin carried by the support and engaging with the double spiral configuration of the weed extracting element for controlling the rotary movement of said element; a spirally shaped member having connection with said element; means movable relative to said support and having an operative connection with said member for actuating the same to cause relative rotary and longitudinal movement of said weed extracting element; and stop means on said support for determining the extent of longitudinal movement of said element relative to said support.

5. A weed extracting device including a housing; a weed extracting element having a double spiral configuration disposed adjacent one end of the housing for longitudinal movement into and out of the housing; means including a transversely extending bar carried by the housing and engageable with the spiral configuration of the weed extracting element for controlling the rotary movement of said element; a member having operative connection with said element; means movable relative to said housing and having connection with said member for actuating the latter to cause rotary and longitudinal movement of said weed extracting element; an abutment formed on said housing, and means connected with said element cooperating with said abutment for determining the extent of longitudinal movement of said element.

6. A weed extracting device including a tubular housing; a tubular member associated with said housing and arranged for telescoping movement with respect thereto; a weed engaging element including a pair of prongs of spiral configuration disposed adjacent an end of said housing; means associated with said tubular member for causing rotary and longitudinal movement of said weed engaging element relative to said housing; a pin carried by said housing and extending between the prongs of said weed engaging element for controlling the rotation of said element; a bar connected to the said engaging element, means cooperating between said bar and said housing for determining the extent of longitudinal movement of said weed engaging element relative to said housing, and means for preventing relative rotation between the tubular housing and tubular member.

7. A weed extracting device including a tubular housing; a tubular member associated with said housing and arranged for telescoping movement with respect thereto; a double pronged weed engaging element disposed adjacent an end of said housing; a member carried by said housing and extending between the prongs of said weed engaging element for controlling the rotation of said element; a bar connected to the weed engaging element; means including a spirally shaped member cooperating with said bar and said tubular member for causing relative rotary and longitudinal movement of said weed engaging element, stop means on said bar and said housing arranged to limit relative longitudinal movement of the element in one direction yet permitting further rotary movement of the weed engaging element without longitudinal movement thereof, and means for preventing relative rotation between the tubular housing and tubular member.

8. A weed extracting device including a tubular housing; a tubular member associated with said housing and arranged for telescoping movement with respect thereto; means interconnecting the housing and member preventing rotation of the member relative to the housing; a double-pronged weed engaging element disposed adjacent an end of the housing; a pin carried by said housing and extending between the prongs of the weed engaging element for controlling the rotation of said element; a bar connected to the weed engaging element; a stop secured to the bar; abutment means carried by the housing and engageable with the stop on the bar for determining the extent of longitudinal movement of said weed engaging element relative to the housing; a spirally shaped member connected with said bar, and a disc secured to said tubular member formed with guide means to receive the spirally shaped member, said stop and abutment means being arranged to limit longitudinal movement of the weed engaging element and permit rotational movement of the weed engaging element to the extent permitted by the pin extending between the prongs of the weed engaging element.

9. A weed extracting device including a tubular housing; a tube telescoped within said housing and adapted for longitudinal movement relative thereto; means interconnecting said housing and tube for preventing relative rotation therebetween; a weed extracting element formed with a pair of spirally shaped prongs disposed adjacent one end of the housing for longitudinal and rotary movement into and out of the housing; a pin carried by and extending transversely of the housing and projecting between the prongs of the weed extracting element for controlling the relative rotary movement of said element; a bar secured to said element; said bar having a portion formed with a double-spiral configuration; a guide member secured to said tube and having openings therein to receive the spiral configuration of the bar; an abutment carried by said housing, and a projection on said bar arranged for engagement with the abutment on the housing to limit longitudinal movement of the bar and weed extracting element and permit rotational movement of the weed extracting element defined by the pin.

References Cited in the file of this patent

UNITED STATES PATENTS

| Number | Name | Date |
|---|---|---|
| 402,742 | Kelly | May 7, 1889 |
| 613,176 | Stiles | Oct. 25, 1898 |
| 1,644,426 | Gentsch | Oct. 4, 1927 |
| 1,924,002 | Rush | Aug. 22, 1933 |

FOREIGN PATENTS

| Number | Country | Date |
|---|---|---|
| 6,910 | Sweden | June 6, 1896 |